March 8, 1966  E. R. WIEMANN ETAL  3,239,168
IMPLEMENT SUPPORTING STRUCTURE

Original Filed April 8, 1963   3 Sheets-Sheet 1

INVENTORS
EDWARD R. WIEMANN &
JOHN A. ANDERSON
BY William A. Murray
ATTORNEY

March 8, 1966 E. R. WIEMANN ETAL 3,239,168
IMPLEMENT SUPPORTING STRUCTURE
Original Filed April 8, 1963 3 Sheets-Sheet 2
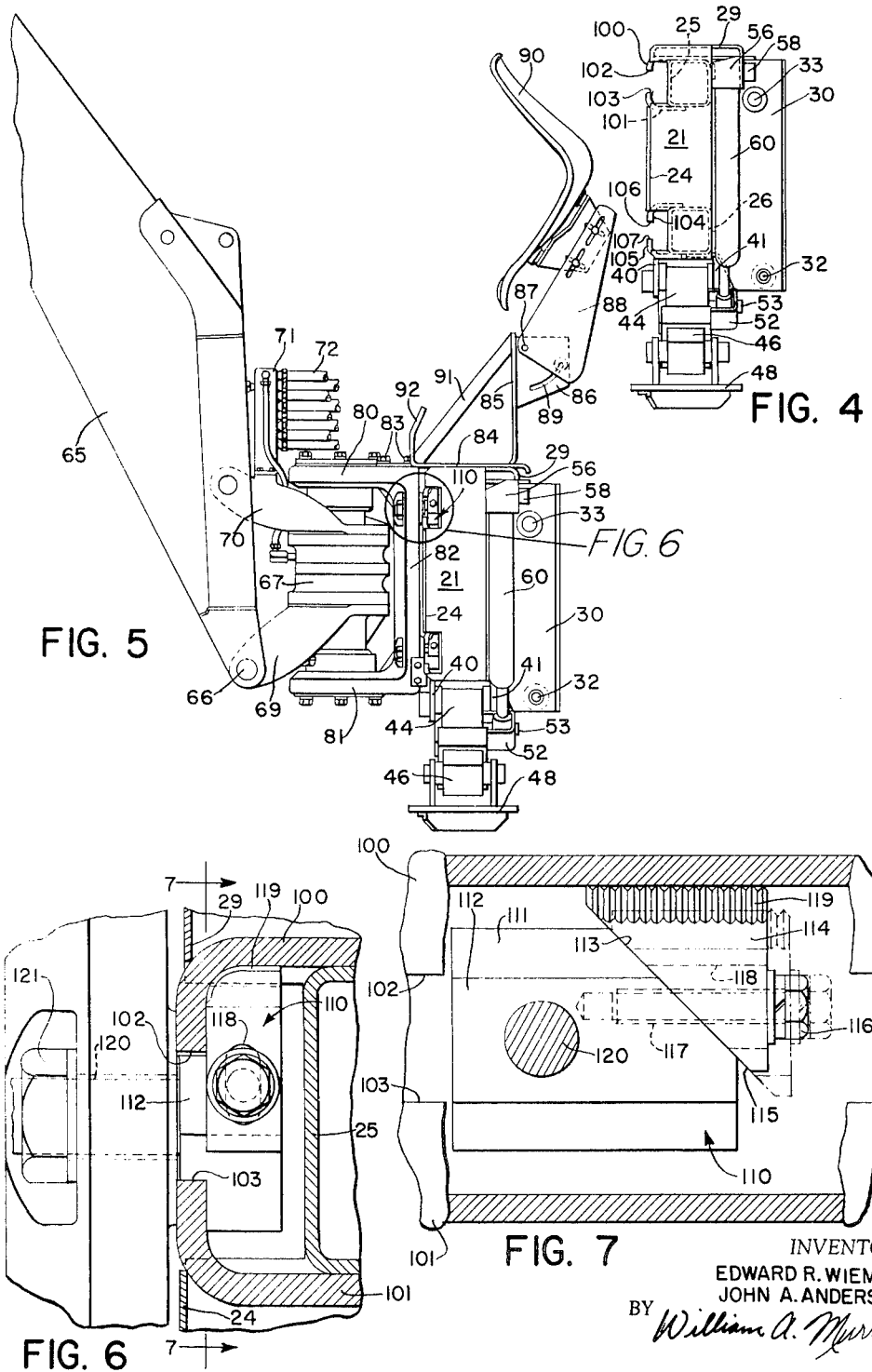
INVENTORS
EDWARD R. WIEMANN &
JOHN A. ANDERSON
BY William A. Murray
ATTORNEY March 8, 1966  E. R. WIEMANN ETAL  3,239,168
IMPLEMENT SUPPORTING STRUCTURE
Original Filed April 8, 1963  3 Sheets-Sheet 3

INVENTORS
EDWARD R. WIEMANN &
JOHN A. ANDERSON
BY William R. Murray
ATTORNEY

United States Patent Office 3,239,168
Patented Mar. 8, 1966

3,239,168
IMPLEMENT SUPPORTING STRUCTURE
Edward R. Wiemann and John A. Anderson, Moline, Ill., assignors to Deere & Company, Moline, Ill., a corporation of Delaware
Original application Apr. 8, 1963, Ser. No. 271,355. Divided and this application Mar. 1, 1965, Ser. No. 435,806
4 Claims. (Cl. 248—13)

This is a division of U.S. patent application Ser. No. 271,355 filed April 8, 1963, now Patent No. 3,215,282.

This invention relates to a supporting stand for an implement that may be suspended on a tractor and preferably on the rear end of a tractor. Still more particularly this invention relates to a supporting stand having vertically adjustable supporting legs and also means on the stand for permitting transverse adjustment of the implement relative to the stand and the tractor.

For purposes of illustration in the present invention, description of the implement will be relative to that of a conventional type backhoe. However, it should be recognized that other types of implements may be used with equal advantage on the type of supporting structure or stand to be described.

In the conventional type backhoe, there is provided a supporting stand mountable on the rear portion of a tractor and having a forward side facing away from the tractor that receives the backhoe implement. It is the primary object of the present invention to provide a new and novel type of upright and transversely disposed supporting stand extending substantially the transverse expanse of the tractor with upper and lower forwardly opening channels therein. The channels retain implement supporting blocks capable of frictionally engaging the walls of the channels so as to prevent transverse movement of the implement. However, if desired, the blocks may be adjusted to permit transverse movement and the implement may therefore be moved transversely relative to the supporting stand.

Other objects and advantages of the structure will become apparent to those skilled in the art as the nature of the invention is better understood from the following description and as shown in the accompanying drawings.

FIG. 4 is an end view of the implement-supporting stand.

FIG. 5 is an end view of the implement-supporting stand and a portion of the backhoe supported thereon.

FIG. 6 is a sectional view taken substantially along the line 6—6 of FIG. 5.

FIG. 7 is a sectional view taken substantially along the line 7—7 of FIG. 6.

Figure 1:
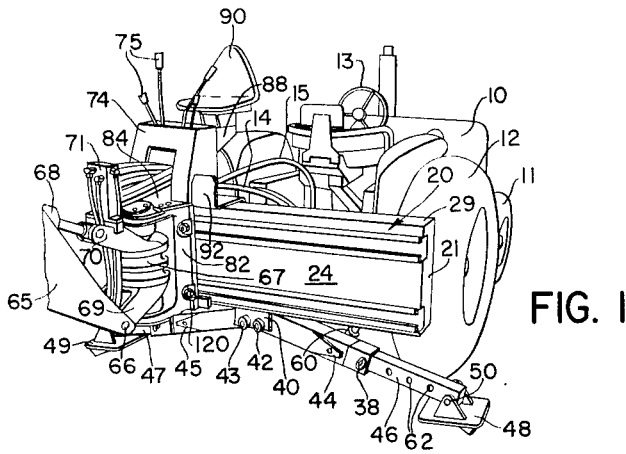
FIG. 1 is a forward and side perspective view of a portion of the backhoe and the tractor.
Figure 2:
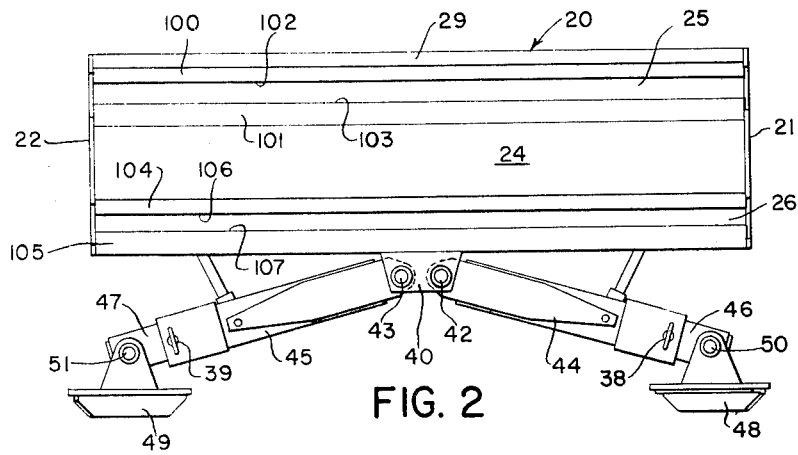
FIG. 2 is a front view of the implement-supporting stand.
Figure 3:
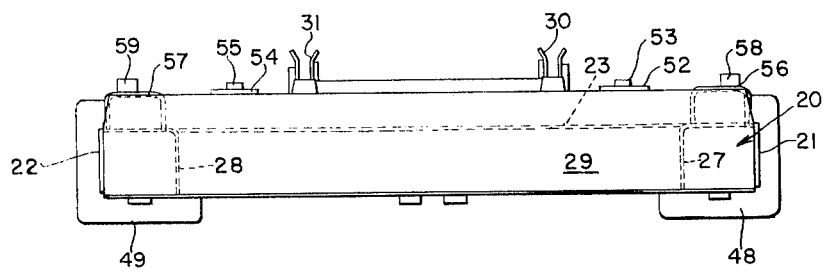
FIG. 3 is a top view of the implement-supporting stand.

The implement is supported on a tractor having a main body 10, steerable wheels 11, and traction wheels 12. The tractor is controlled from an operator's station indicated by a steering wheel 13. The tractor also has a conventional hydraulic system, not shown, but which has a pair of hydraulic hoses 14, 15 extending to and adapted for connection to the implement.

The supporting stand includes an upright transversely extending box-like structure 20 having transversely spaced left- and right-hand upright side plates 21, 22, an upright rear transverse wall 23 and a forward upright transverse wall 24 interconnecting the rear and front edges of the plates 21, 22. Also extending between the end plates 21, 22 are upper and lower box channels 25, 26. End channels shown in dotted representation 27, 28 extend between the upper and lower channels 25, 26 and with the latter channels supply the framework for the supporting stand 20. An overhead panel 29 closes the upper portion of the structure 20.

Projecting rearwardly from the rear wall 23 is a pair of upright supporting brackets 30, 31 spaced apart transversely and adapted for connection to the tractor, pivotal connecting means, such as shown at 32, 33, being provided for connection to the tractor. As is conventional the connections are such that the entire structure 20 and its implement may be suspended from the end of the tractor.

Depending rigidly from the underside of the structure 20 is a pair of brackets 40, 41 spaced fore-and-aft and carrying a pair of fore-and-aft horizontal pivot pins 42, 43. Main stabilizing legs 44, 45 are pivotally mounted on the pivot pins 42, 43 and extend outwardly therefrom toward the outer ends of the structure 20. The stabilizing leg portions 44, 45 are of box construction and contain telescoping outer leg extensions 46, 47. The leg extensions 46, 47 have therein a series of longitudinally spaced openings such as is shown at 62 (FIG. 1) for receiving pins 38, 39 extending through the respective leg portions 44, 45. The outer ends of the extensions 46, 47 carry ground-engaging pads 48, 49 by means of pivot pins 50, 51.

U-shaped bracket structures 52, 54 project rearwardly from the rear faces of the leg portions 44, 45 and support pivot pins 53, 55 respectively. At the upper left- and right-hand corners of the upright structure 20 is provided a pair of U-shaped brackets 56, 57 respectively supporting fore-and-aft extending pivots 58, 59. The pivots extend rearwardly from the rear wall 23 and have supported thereon a pair of extensible hydraulic units 60, 61 having lower ends supported on the fore-and-aft extending pivots 53, 55 respectively. As is clearly apparent, therefore, the stabilizing legs may be raised and lowered and may also be extended or retracted to the desired location. For example, if the backhoe is desired to be operated on a hill in which the ground level on one side of the hoe is higher than the other side, one of the leg structures may be extended and the cylinder extended a greater length to cause the respective pad on the leg structure to contact the lower level of ground. Also, should a previous excavation be located somewhat nearer the location of the pad, the leg structure may be extended or retracted to move the pad a distance from the previous excavation and on relatively solid ground.

Figure 8:
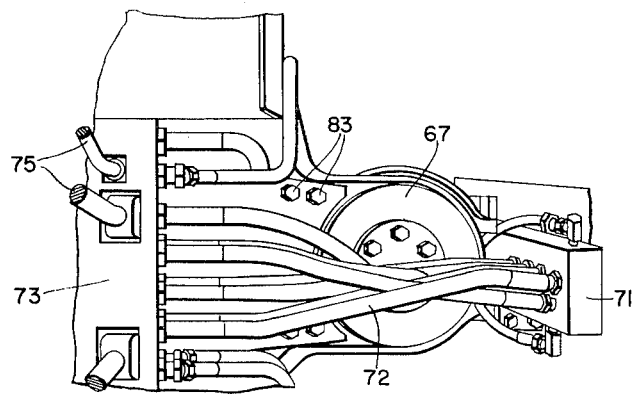
FIG. 8 is a top perspective view of the portion of the backhoe adjacent the swivel structure of the backhoe.

The backhoe, shown only partially in FIGS. 1 and 5, is composed of a boom structure 65 pivotally mounted on a transverse pin 66 at its lower end to a swivel cylinder 67. The swivel cylinder also has connected to its upper portion an extensible cylinder 68 for raising and lowering the boom structure 65. A swing cylinder 67 supports the boom 65 by means of a pair of lower forwardly projecting arms 69 carrying the lower pivot pin 66, and a pair of upwardly projecting arms 70 carrying the pivot pin connected to the upper cylinder 68. Also supported on the arms 70 is an upwardly projecting manifold block 71 disposed forwardly of the axis of the swing cylinder 67. The block 71 has various fluid hoses 72 extending from a valve system, indicated in its entirety by the reference numeral 73, on the rear side of the swing cylinder 67 and contained within a housing 74. The valve system is controlled by suitable levers, such as at 75, and feeds fluid through the manifold block and into various parts of the backhoe. Detailed description of the manifold block 71 is shown and described in U.S. Patent 3,120,897, issued February 11, 1964, and entitled Backhoe. As may be seen in FIG. 8, the hoses 72 are so disposed as to cross over one another from one side of the axis of the cylinder 67 between the rear valve block 73 to the forward manifold block 71. The hoses 72 cross one another substantially on the vertical extension of the axis of the cylinder 67.

The swing cylinder 67 is swivelly mounted on a casting support having an upper horizontally disposed portion 80 and a lower horizontally disposed portion 81 suitably supporting a fixed post, not shown, which operates as the axis of swivel for the swinging cylinder 67. The upper and lower portions are interconnected by a rear vertically extending cast section 82 lying against the forward upright wall 24. The upper surface of the upper casting portion 80 is level and has bolted thereto, as at 83, a rearwardly projecting plate 84 overlying the upper panel wall 29 of the main supporting structure 20. The plate 84 is L-shaped with a vertically disposed portion 85 projecting upwardly just rearwardly of the rear wall portion 23. The portion 85 is braced as at 91 to the horizontal portion 84 for strength. Extending rearwardly from the rear upright face of the portion 85 is bracket structure 86 having pivotally mounted at 87 thereon a seat bracket 88. The bracket 88 is further supported by a releasable pin received in an arcuate slot 89 in the bracket 86. Consequently the seat bracket 88 may be swung upwardly or downwardly for the convenience of the operator. Supported on the bracket 88 is a seat 90.

The main plate 84 has a pair of upwardly projecting foot guards, one of which is shown at 92, on opposite sides of the housing 74. As may be seen from viewing FIGS. 1, 5 and 8, the entire backhoe structure including valve structure 73, the seat 90 and manifold 71, is supported basically by the casting portions 80, 81 and 83. It should be noted that if the casting is moved transversely along the frame structure 20, the seat will also move. However, the seat will remain stationary in the sense that it will always face forwardly and will not swivel as the boom 65 and the other portions of the backhoe swivel from side to side.

Fixed to the upper and lower surface of the upper channel 25 is a pair of L-shaped channels 100, 101 projecting forwardly and having vertical leg portions extending toward one another to opposed edges 102, 103, defining a transverse horizontal slot extending completely across the forward surface of the main support 20. The channels 100, 101 are fixed to the channel 25 and the vertical leg portions are positioned forwardly of the vertical forward side of the channel 25 so that the channels 100, 101 define with the forward side a C-shaped channel extending across the forward side of the support 20. Upper and lower L-shaped channels 104, 105 are fixed to the upper and lower portions of the channel 26 and in similar manner so that their leg portions are opposed to one another and their edges 106, 107 respectively defined a transverse horizontal slot extending across the lower portion of the structure 20.

Contained within the upper and lower C-shaped channels are transversely spaced block structures, indicated in their entirety by the reference numeral 110, composed of a main portion 111, T-shaped in cross section, with a stem portion 112 extending into the slots defined by the edges 102, 103 and 106, 107. The main portion 111 has a diagonal surface or ramp 113. Bearing against the ramp surface 113 is a second ram follower portion 114 also having a diagonal surface 115. The two portions are joined together by a bolt 116 threadedly received in an opening 117 in the main portion 111. An elongated slot 118 is provided in the second portion 114 so as to permit the second block portion 114 to move vertically or up and down the ramp surface 113 as the bolt is tightened or withdrawn. The upper surface and corner of the second portion 114 is serrated at 119 so as to provide an improved frictional engagement with the inner surface of the adjacent L-shaped channel member.

Projecting forwardly from each of the blocks 111 and through the slots formed by the upper and lower edges 102, 103 and 106, 107 are threaded implement mounting elements or studs 120. The studs extend through opposite sides of the casting block 82 and receive nuts 121 that lock the entire casting and consequently the entire implement to the block structures 110. Consequently by loosening the tightening nuts 116 and swinging the backhoe cylinders in a position to utilize the power of the cylinders, the entire backhoe assembly and support may be moved transversely within the C-shaped channels formed by the upper beam 25 and upper and lower L-shaped channels 100, 101 and the lower beam 26 and the upper and lower L-shaped channels 104, 105. When it is desired to tighten or loosen the bolts 116, a wrench may be inserted through the respective slots formed by the edges 102, 103 and 106, 107. It should also be that when it is desired to move the backhoe to reposition it along the main structure 20, the seat 90 will move with the backhoe structure. However, when the swing cylinder 67 is utilized to swing the backhoe boom 65 and remainder of the backhoe, the seat 90 will only face forwardly and not be swung with the backhoe. It is believed that this offers considerable advantage over some of the prior uses in which the seat is connected directly to the backhoe boom 65 so as to swing with the boom. Primarily among these advantages is the feature of safety since in many instances the backhoe will swing at a high rate and consequently if the seat 90 were rigid with it, there would be abrupt swinging of the seat. Also, with many operators the swinging action of the seat about a relatively small axis creates rather an uncomfortable condition.

Figure 9:
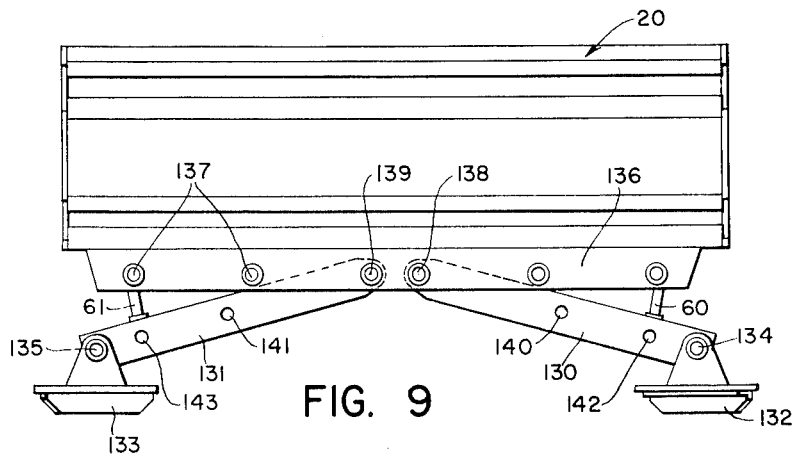
FIG. 9 is a front view of a modified form of the invention.
Figure 10:
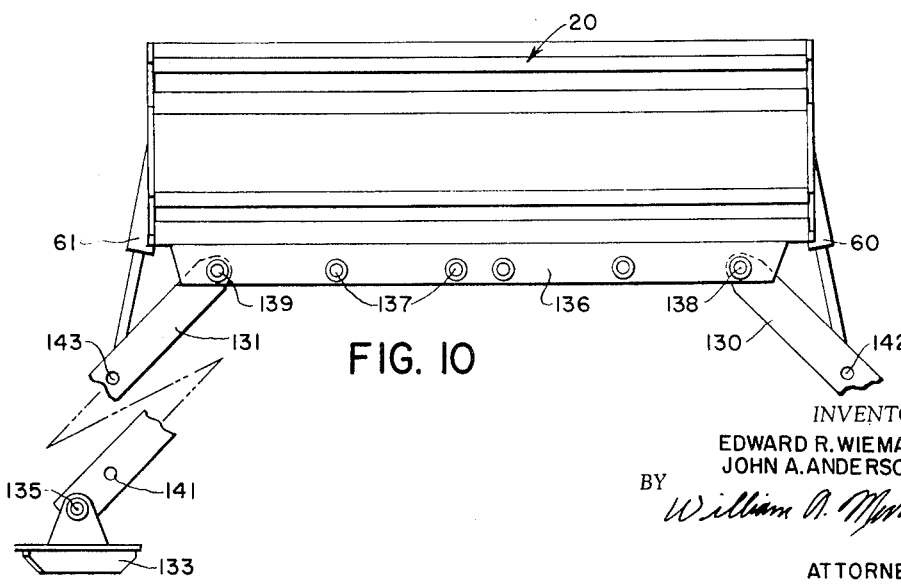
FIG. 10 is a front view of the structure as shown in FIG. 9 showing a different disposition of parts.

In the modification of a structure shown in FIGS. 9 and 10, the basic box structure 20 is identical to that previously described. The main difference lies in the stabilizing legs 130, 131. The latter are composed of a single box-like structure having pads 132, 133 pivoted at 134, 135 directly thereto. While the previous form of the invention used telescoping type stabilizing legs for extending the reach of the stabilizer, the present invention utilizes a bracket structure 136 depending from the underside of the main box structure 20 and extending substantially the entire length of the box structure. The bracket structures 136 have a series of transversely spaced fore-and-aft extending pivot holes 137. The holes may receive pivot pins 138, 139 that pivotally mount the stabilizer legs 130, 131 to the box structure 20. Should it be desired to extend the legs 130, 131 beyond the transverse expanse of the box structure, it is merely necessary to reposition the pivot pin 138 or 139 and their respective stabilizing legs 130, 131 to a different pivot opening 137 in the bracket structure 136. Such a reposition of the legs 130, 131 is shown in FIG. 10. Hydraulic cylinders 60, 61 extending between the frame structure 20 and the stabilizing legs operate to raise and lower the legs 130, 131. In order to accommodate the transverse repositioning of the stabilizer legs 130, 131, each leg is provided with longitudinally spaced openings 140, 141 that receives pivot pins 142, 143 connecting the lower piston ends of the hydraulic units 60, 61. As is shown in FIG. 10, the legs 130, 131 are positioned in their outermost positions on the frame structure 20, and the rams of the hydraulic units 160, 161 are connected to the innermost openings 140, 141 of the legs.

While only one modification of the unit has been shown, it should be recognized that other forms and variations of the invention will become clearly apparent to those skilled in the art. Therefore, while the present forms have been shown and described for the purpose of clearly and concisely illustrating the principles of the invention, it is not intended to limit or narrow the invention beyond the board concept set forth in the appended claims.

What is claimed is:

1. A tractor mountable supporting stand for an implement comprising: an upright structure disposed at one end of a tractor transversely to the line of travel and having transversely spaced ends and transverse upright front and rear sides facing the implement and tractor respectively; rear mounting means on the structure adapted for connection to and support on the tractor; means providing horizontal and parallel upper and lower C-shaped transverse channels extending substantially the transverse length of the structure with the channels opening forwardly and having upper and lower vertical lips spaced vertically apart to define transverse horizontal slots; transversely movable block structures retained within the C-shaped channels, the block structures having means thereon adjustable to engage and disengage the walls of the channels and thereby lock and release respectively the block structures against and for movement, the latter means being adapted for adjustment externally of the upright structure; and forwardly extending implement connecting elements on the block structures extending through the respective slots.

2. A tractor mountable supporting stand for an implement comprising: an upright structure disposed at one end of a tractor transversely to the line of travel and having transversely spaced ends and transverse upright front and rear sides facing the implement and tractor respectively; rear mounting means on the structure adapted for connection to and support on the tractor; means providing horizontal and parallel upper and lower hollow transverse channels extending substantially the transverse length of the structure, the channels having forwardly opening transverse horizontal slots; transversely movable block structures retained within the channels, the block structure having thereon means for moving a part thereof to selectively engage and disengage the walls of the channels and thereby lock and release respectively the block structures against and for movement, the latter means being adapted for control external of the upright structure to effect the movement of the movable part; and forwardly extending implement connecting elements on the block structures extending through the respective slots.

3. A tractor mountable supporting stand for an implement comprising: an upright structure disposed at one end of a tractor transversely to the line of travel and having transversely spaced ends and transverse upright front and rear sides facing the implement and tractor respectively; rear mounting means on the structure adapted for connection to and support on the tractor; means providing horizontal and parallel upper and lower hollow transverse channels extending substantially the transverse length of the structure, the channels having forwardly opening transverse horizontal slots; transversely movable block structures retained within the channels, at least one of the block structures including a pair of rigid members having adjoining and engaging inclined surfaces and means for adjusting the members along their inclined surfaces whereby at least one of the members is adjustable to engage and disengage a wall of the respective channel and thereby lock and release respectively the block structure against and for movement; and forwardly extending implement connecting elements on the block structures extending through the respective slots.

4. A tractor mountable supporting stand for an implement comprising: an upright structure normally dispossed at one end of a tractor transversely to the line of travel and extending to opposite transversely spaced ends, the structure being composed of upper and lower spaced apart and rigidly connected transverse beams; rear mounting means on the structure adapted for connection to and support on the tractor; means providing parallel upper and lower C-shaped transverse channels and extending substantially the transverse length of the upright structure with the channels opening forwardly and having overhanging upper and lower lips with opposed edges and defining upper and lower slots respectively; transversely movable block structures retained within the chambers adjustable to frictionally engage the internal walls of the chamber, the block structures being composed of two members having adjoining surfaces lying in an inclined plane whereby one inclined surface defines an inclined ramp and the other defines a ramp follower; adjusting means between the members for moving the follower on the ramp surface; and forwardly projecting implement connecting elements projecting from the block structures and through the respective slots.

References Cited by the Examiner

UNITED STATES PATENTS

| | | | |
|---|---|---|---|
| 2,302,812 | 11/1942 | Stempel | 248—16 |
| 2,994,446 | 8/1961 | Auwelaer et al. | 214—138 |
| 3,117,685 | 1/1964 | Davis | 214—138 |
| 3,156,488 | 11/1964 | Kelly | 280—456 |

FOREIGN PATENTS 115,916  9/1942  Australia.

CLAUDE A. LE ROY, *Primary Examiner.*

R. P. SEITTER, *Assistant Examiner.*